(12) United States Patent
Sisson

(10) Patent No.: US 11,950,620 B2
(45) Date of Patent: Apr. 9, 2024

(54) FOOD PROCESSOR

(71) Applicant: Robert Sisson, Olympia, WA (US)

(72) Inventor: Robert Sisson, Olympia, WA (US)

(*) Notice: Subject to any disclaimer, the term of this patent is extended or adjusted under 35 U.S.C. 154(b) by 799 days.

(21) Appl. No.: 17/073,272

(22) Filed: Oct. 16, 2020

(65) Prior Publication Data

US 2021/0169118 A1 Jun. 10, 2021

Related U.S. Application Data

(60) Provisional application No. 62/944,628, filed on Dec. 6, 2019.

(51) Int. Cl.
*A23N 7/10* (2006.01)
*A23L 27/10* (2016.01)

(52) U.S. Cl.
CPC .............. *A23N 7/10* (2013.01); *A23L 27/105* (2016.08); *A23V 2002/00* (2013.01)

(58) Field of Classification Search
CPC ...... A23N 7/10; A23L 27/105; A23V 2002/00
USPC ............................................ 99/584; 83/623
See application file for complete search history.

(56) References Cited

U.S. PATENT DOCUMENTS

| | | | | |
|---|---|---|---|---|
| 5,373,765 | A * | 12/1994 | Asano | B30B 1/18 100/264 |
| 6,314,852 | B1 * | 11/2001 | Long | B26F 1/02 100/219 |
| 6,408,726 | B1 * | 6/2002 | Taijonlahti | B23Q 16/001 83/563 |
| 8,555,763 | B2 * | 10/2013 | Farid | B26D 7/1818 83/633 |
| 11,612,683 | B2 * | 3/2023 | Khalaj | A61M 1/892 30/114 |
| 2017/0215453 | A1 * | 8/2017 | Carlock | A23G 3/0097 |
| 2018/0020713 | A1 * | 1/2018 | Schmilovitch | A23N 7/08 99/538 |
| 2018/0360053 | A1 * | 12/2018 | Massa | A21C 15/04 |
| 2021/0354326 | A1 * | 11/2021 | Yang | A23N 7/02 |
| 2022/0033238 | A1 * | 2/2022 | Danieli | B67D 1/0071 |
| 2022/0312805 | A1 * | 10/2022 | Vierheller | A47G 21/18 |
| 2022/0338525 | A1 * | 10/2022 | Benesh | A23P 30/10 |
| 2023/0127308 | A1 * | 4/2023 | Xu | A23N 7/026 99/486 |

* cited by examiner

*Primary Examiner* — Omar Flores Sanchez

(57) ABSTRACT

A food processor including a receptacle configured to receive foodstuffs having a skin or peel, a first actuator operably coupled to the receptacle defining a first food processing range of motion, the receptacle selectively movable within the first food processing range of motion, and a second actuator operably coupled to a cutting member disposed in vertical juxtaposition to the receptacle, the cutting member selectively movable within a second food processing range of motion.

19 Claims, 6 Drawing Sheets

FOOD PROCESSOR

CROSS-REFERENCE TO RELATED APPLICATIONS

This application claims the benefit of U.S. Provisional Patent Application No. 62/944,628, filed Dec. 6, 2019, which is incorporated herein by reference in its entirety.

BACKGROUND

This disclosure relates generally, to the preparation of food and more particularly, to food processing appliances used to prepare food by conducting processing operations, including, but not limited to, peeling, chopping, slicing, dicing, and mincing, the foodstuff.

While some fruits and vegetables have a skin or peel that can be generally higher in antioxidants, fiber, vitamins, and minerals than their flesh, certain fruits, like tropical fruits should always be peeled, despite the skin's nutritional content, because the skins are too difficult to chew and digest. The avocado is another fruit with skin that is so tough, it is inedible. Some vegetables, such as onions and garlic have a skin that might otherwise be digestible, but their skin is not nutritionally beneficial or tasty.

Consumable garlic and garlic cloves, in particular, come from the garlic plant's bulb. Peeling garlic cloves can be difficult as cooks try to find a way to use their fingernails to scratch off the skin or to cut off the top of the clove with a knife in an attempt to then use their fingernails to peel back the skin in a direction toward the bottom of the clove. One way to peel garlic is to place a clove on a chopping board, then place the flat side of a knife against it and push down on the back of the knife with the hand. The knife will crush the clove downwards and loosen the skin, allowing less effort in scratching off the skins. Another method involves pulling apart all the cloves from the bulb and placing them in a mason jar with the lid on. The jar is shaken for 20 seconds or so, after which some of the cloves may have partially peeled themselves. Still, another handheld kitchen utensil, such as a garlic press or garlic crusher, forces the garlic cloves through a grate with the use of some type of piston.

An appliance that is designed to not only peel fruits and vegetables, but in addition, chop, slice, dice, and mince fruits and vegetables, would be a welcome addition to any household kitchen.

SUMMARY

A food processor appliance for fruits and vegetables, generally including, a receptacle configured to receive foodstuffs having a skin or peel, a first actuator operably coupled to the receptacle defining a first food processing range of motion, the receptacle selectively movable within the first food processing range of motion, and a second actuator operably coupled to a cutting member disposed in vertical juxtaposition to the receptacle, the cutting member selectively movable within a second food processing range of motion.

In accordance with an embodiment, a garlic processor appliance that leaves no odor on the hands, separates and catches the garlic skins for easy discard, and gathers either whole peeled cloves or processed garlic for easy transfer directly to any dish or recipe, generally includes, a receptacle configured to receive foodstuffs having a skin or peel, a first actuator operably coupled to the receptacle defining a first food processing range of motion, the receptacle selectively movable within the first food processing range of motion, and a second actuator operably coupled to a cutting member disposed in vertical juxtaposition to the receptacle, the cutting member selectively movable within a second food processing range of motion.

BRIEF DESCRIPTION OF THE DRAWINGS

Corresponding reference numerals indicate corresponding parts throughout the several views of the drawings.

Figure 1:
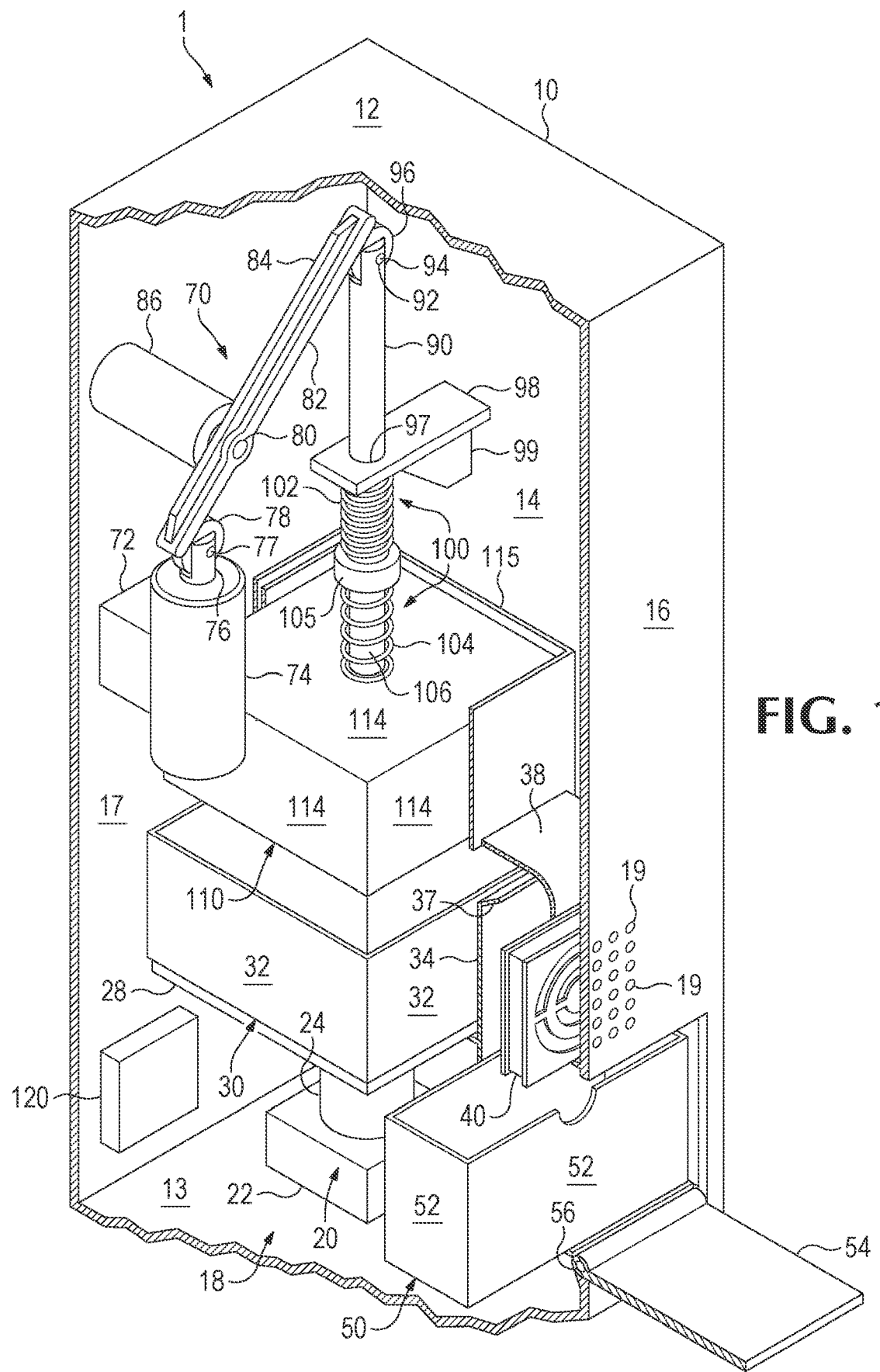
FIG. 1 is a top, rearward, perspective view of a food processor, according to an embodiment of the present disclosure.

The drawings described herein are for illustrative purposes only of select embodiments and not all possible implementations, and are not intended to limit the scope of the present disclosure.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

With reference primarily to FIG. 1, a food processor 1 is depicted. In an embodiment, food processor 1 includes housing 10, peel drive mechanism 20, food bin 30, fan 40, skin catch 50, and crusher members 60. Also included within the food processor 1 are cut drive mechanism 70, fulcrum 80, column 90, spring-spring combination 100 and cutting support 110.

In various embodiments, the food processor 1 can be well suited for a variety of different foodstuffs. It can, for example, peel, chop, slice, dice, and mince a variety of foodstuffs, especially vegetables, fruits, herbs, other foodstuffs that include a lightweight, skin S, like garlic, which might otherwise be removable by mashing garlic cloves C with the side of the blade of a knife and the heel of the palm of the hand.

With continuing reference to FIG. 1, housing 10 can, but not necessarily, be generally or approximately cubical in shape with a top 12, bottom 13, front 14, back 15, left side 16, and right side 17. The housing 10 includes an interior 18 formed within the top 12, bottom 13, front 14, back 15, left side 16, and right side 17 of the food processor 1. The illustrative example of the shape of the food processor 1 is not intended to preclude embodiments which incorporate similar or equivalent household appliances that facilitate operation of electromechanical systems, currently or prospectively available.

Housing 10 can, but not necessarily, be made of stainless steel, die-cast aluminum and zinc, or cool reach steel or BPA-free plastic in order to be less likely to retain heat. An exhaust/vent 19 can, but not necessarily be, constructed between the interior 18 and the left side 16 of the food processor 1. The commercially available examples of the manufacturing materials of the food processor 1 are not intended to preclude embodiments which incorporate similar or equivalent household appliances that facilitate operation of electromechanical systems, currently or prospectively available.

A power input of the food processor 1 can be an AC input or battery power input for electrical control which can include a timer circuit and a logic circuit for programming the run time and intensity output of the food processor 1. The commercially available examples of the power input of the food processor 1 are not intended to preclude embodiments which incorporate similar or equivalent AC inputs or battery inputs, currently or prospectively available.

A microcontroller can, but not necessarily, be a chip and integrated circuit board with a processor, memory, and a bootloader that allows the uploading of new code to the microcontroller, without the use of an external hardware programmer. The microcontroller can also include SRAM and an EEPROM, which can be read and written with the EEPROM library. The examples of the microcontroller of the food processor 1 are not intended to preclude embodiments which incorporate similar or equivalent processors and computer applications that facilitate operation of household appliances, currently or prospectively available.

With reference to FIG. 2, FIG. 3, FIG. 4, and FIG. 5, and continuing reference to FIG. 1, the food processor 1 incorporates a peel drive mechanism 20 which includes food bin 30, fan 40, skin catch 50 and crusher members 60. Peel drive mechanism 20 is made up of a base 22 and electromechanical actuator 24 having a shaft 26, dock 27, and push plate 28. The electromechanical actuator 24 can, but not necessarily, be a commercially available push-type solenoid, pull-type solenoid, or a push/pull-type solenoid. The illustrative and commercially available examples of the electromechanical actuator 24 of the peel drive mechanism 20 are not intended to preclude embodiments which incorporate similar or equivalent electric motors, cam shafts with lifter plates, cranks, crank substitutes, or other solenoids currently or prospectively available.

Figure 2:
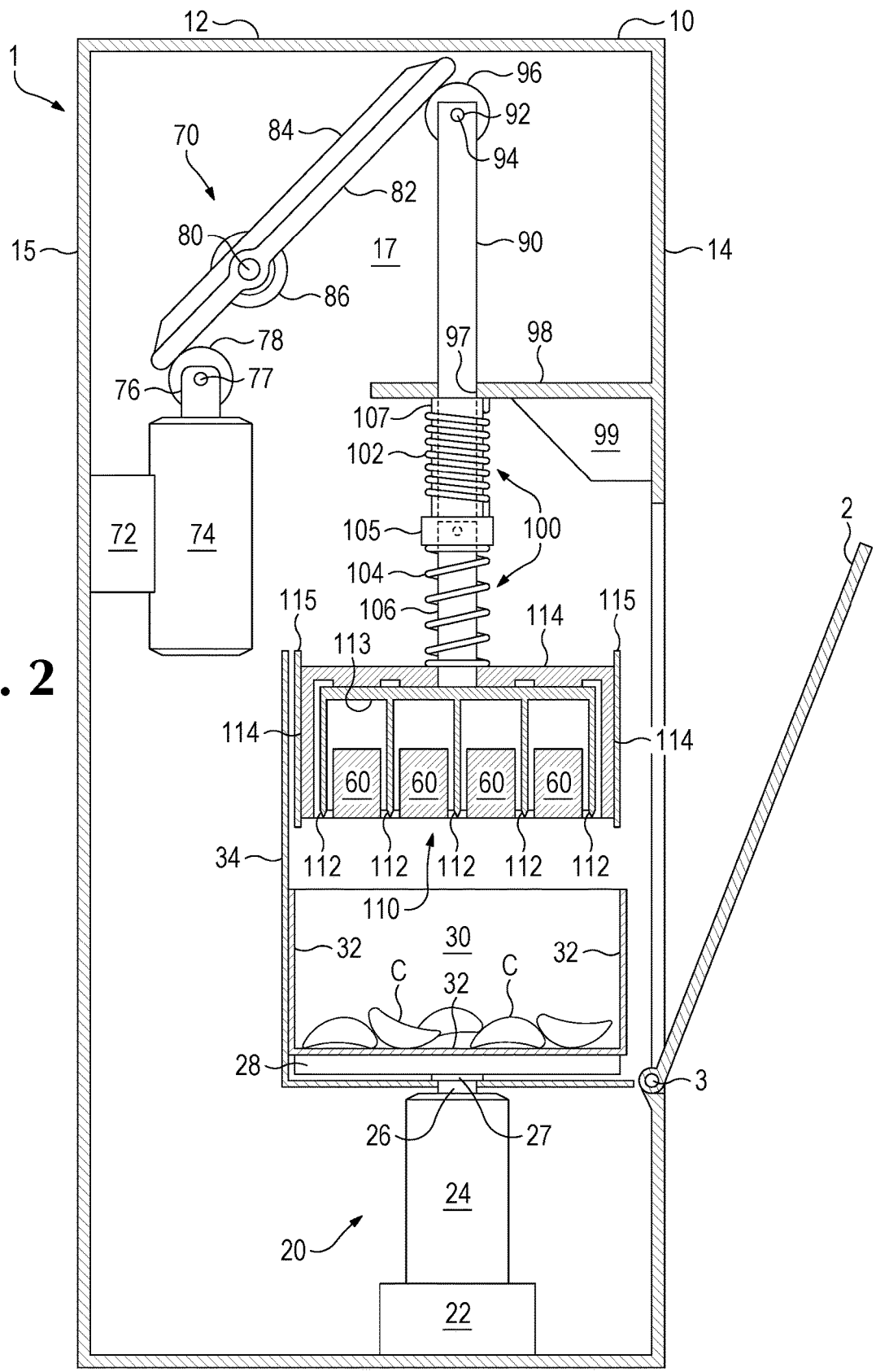
FIG. 2 is a left, side view of an embodiment of the food processor of FIG. 1, including foodstuffs having been added to the food bin.
Figure 3:
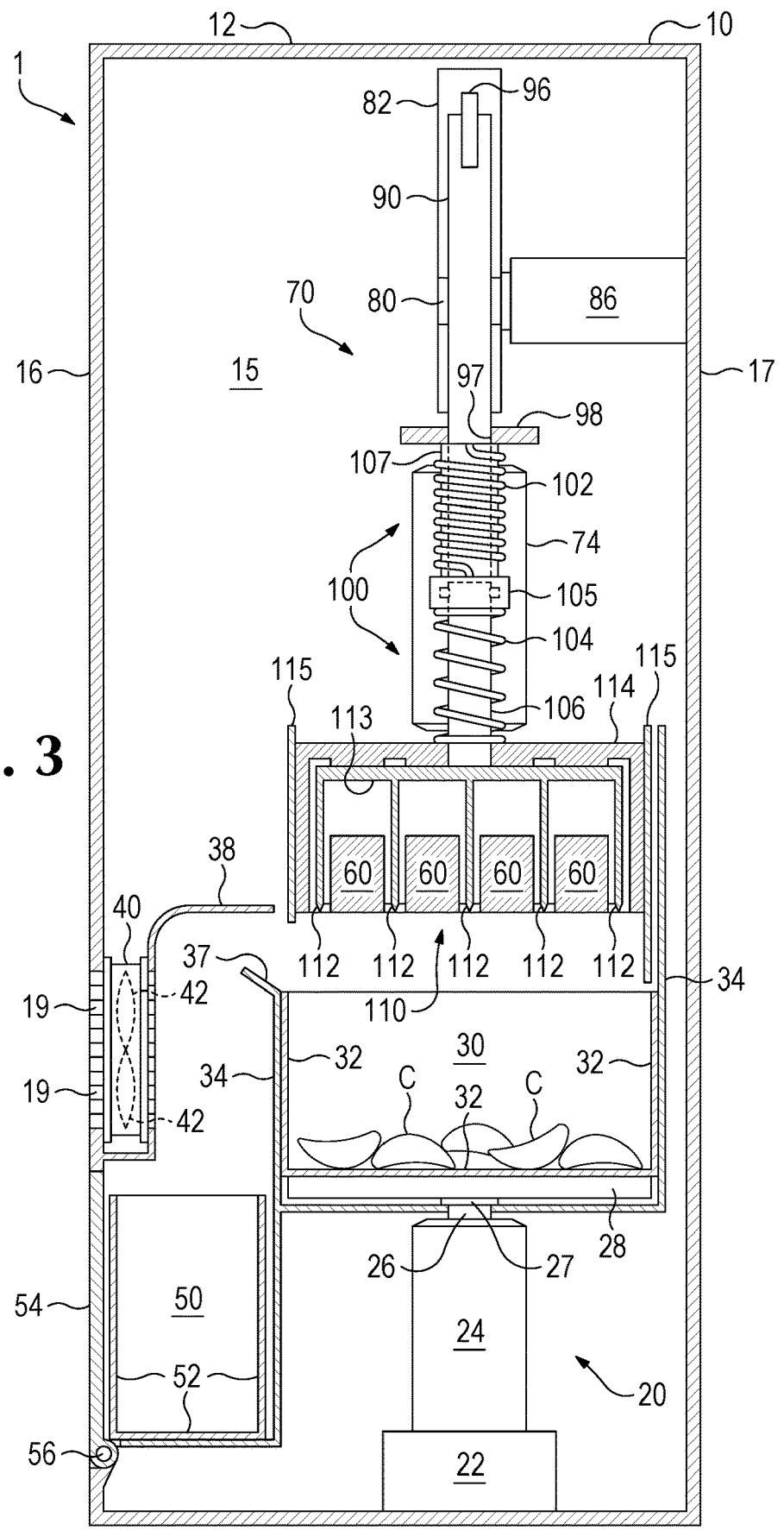
FIG. 3 is a front, side view of an embodiment of the food processor of FIG. 1.
Figure 4:
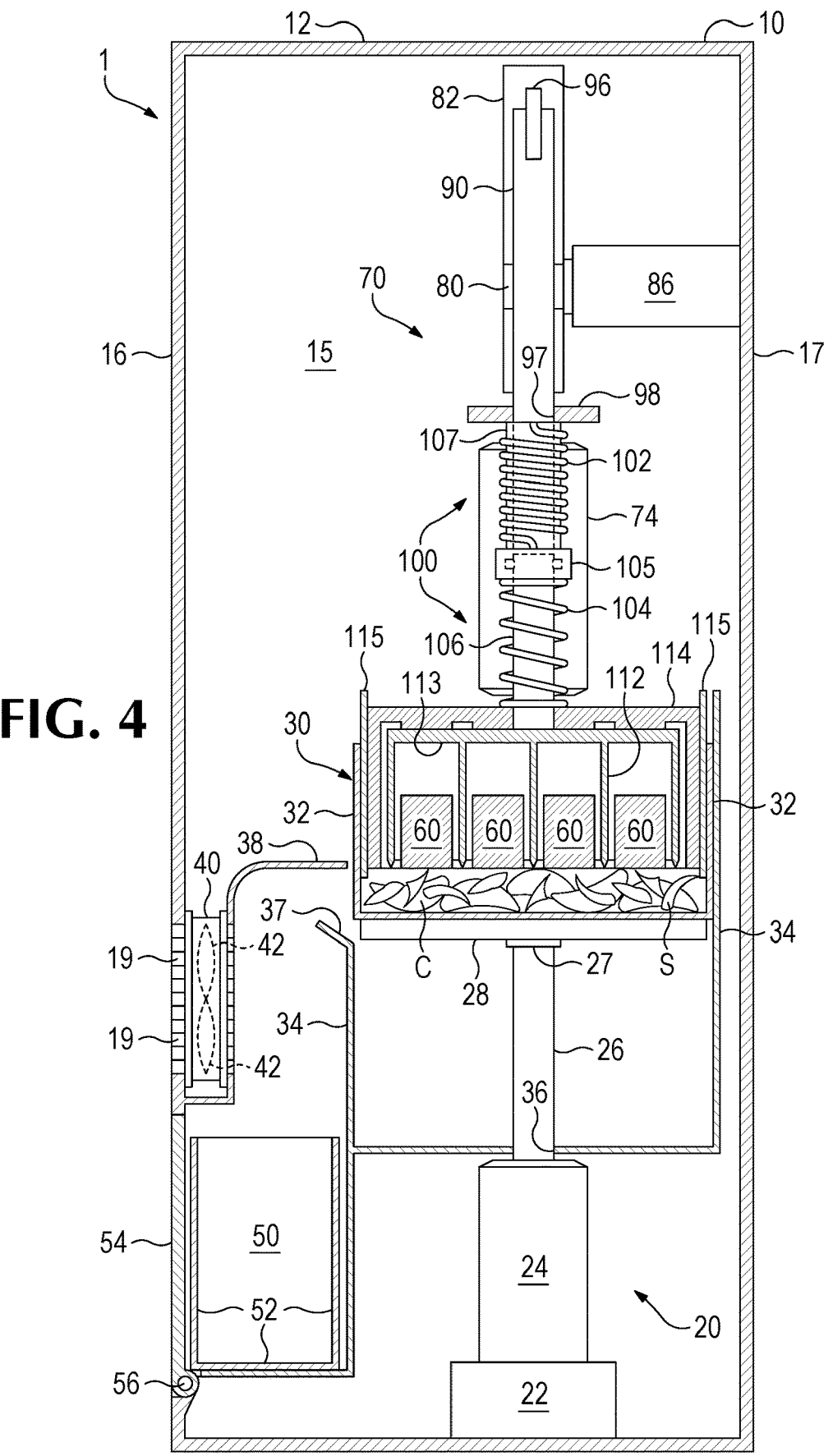
FIG. 4 is a front, side view of an embodiment of the food processor of FIG. 1, including peeled foodstuffs.

With reference primarily to FIG. 2, door 2 having hinge 3 of the food processor 1 is opened, allowing the food bin 30 to be removed from atop the push plate 28. A handful of garlic cloves C are tossed into the food bin 30 and food bin 30 is returned to the interior 18 of the food processor 1. Food bin 30 can, but not necessarily, be a receptacle constructed with sidewalls 32 or sidewalls and a bottom floor 32 and made out of clear BPA-free plastic or silicone. In an embodiment, the push plate 28 replaces the bottom floor 32 of the garlic bin 30 and can couple to the dock 27 of the shaft 26, in order to provide more control of the actuation of the food bin 30.

With continuing reference to FIG. 1, FIG. 2, FIG. 3, and FIG. 4, as shaft 26 is actuated through the through hole 36 (see FIG. 4 and FIG. 6), to drive the food bin 30 within the restraints of the guide 34 and into crusher members 60, rapidly and/or frequently, depending on the peel program setting selected, the skins S of the garlic cloves C become detached. The food bin 30 can be selectively movable within a first food processing range of motion defined by a repeated upward then downward motion of the food bin 30 caused by the operation of the electromechanical actuator 24. When electromechanical actuator 24 reaches the extent of its range of motion, the garlic cloves C are crushed against the crusher members 60, forcibly and repeatedly, which causes the peeling of the skins S. At the conclusion of the peeling of the skins S from the cloves C, the food bin 30 is lowered away from the crusher members 60 and reset.

Figure 5:
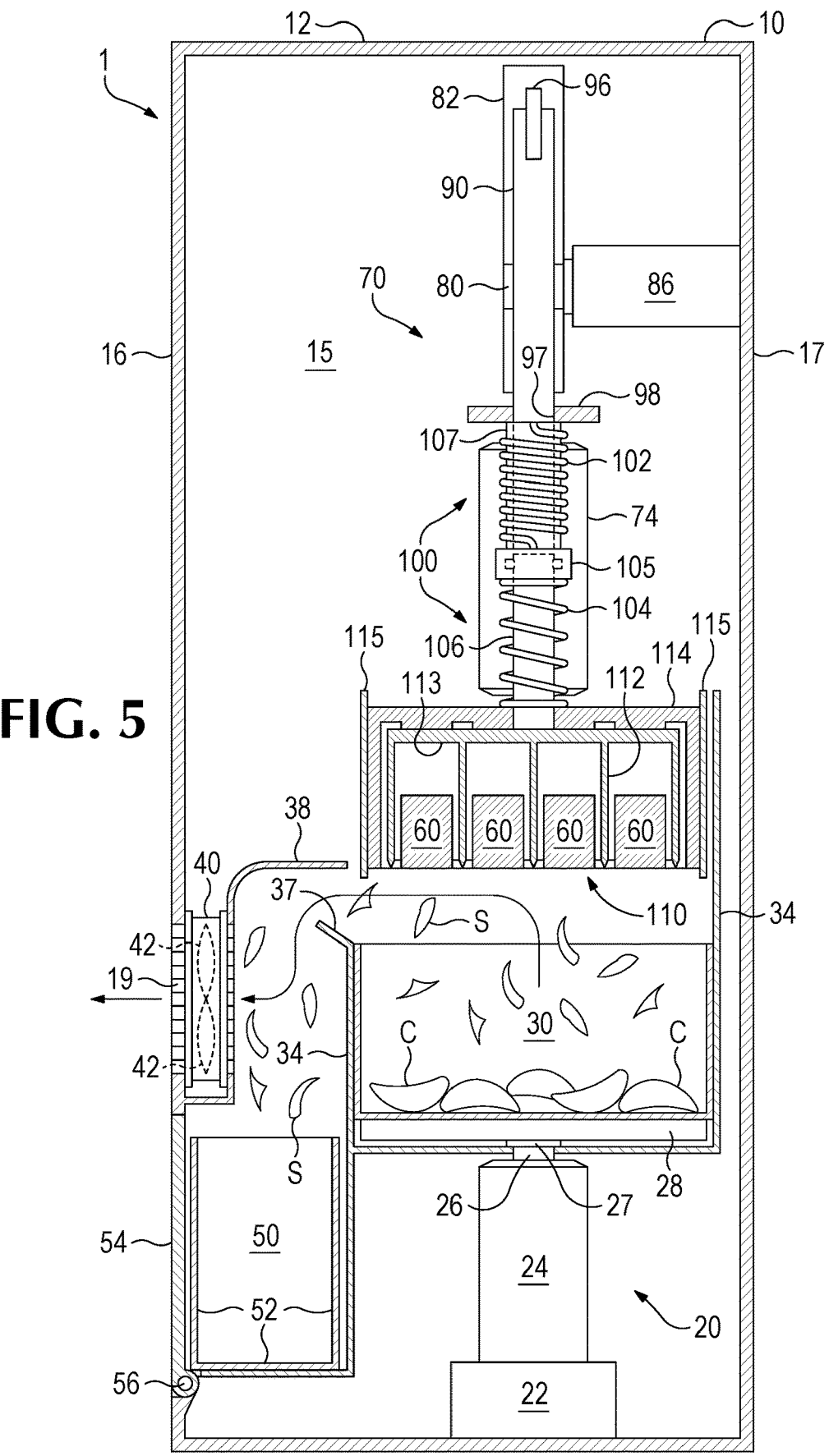
FIG. 5 is a front, side view of an embodiment of the food processor of FIG. 1, including separation of the skin from the peeled foodstuffs.

With reference primarily to FIG. 5, fan 40 having fan blades 42 can be activated to draw the lighter weight skins S from within the food bin 30 over the lip 37 and redirecting the skins S into the shoot wall 38 to finally fall into skin catch 50. Skin catch 50 can, but not necessarily, be a receptacle constructed with sidewalls 52 or sidewalls and a bottom floor 52 and made out of clear plastic or silicone, similar to the garlic bin 30. Skin catch 50 can be removed from within the interior 18 of the food processor 1 through the opening of the catch door 54 having catch hinge 56, in order to discard the skins S. The whole, peeled cloves C can be removed from the food processor 1 and added to any dish or recipe that calls for whole, peeled cloves C or further processed by a knife, if so desired.

Figure 6:
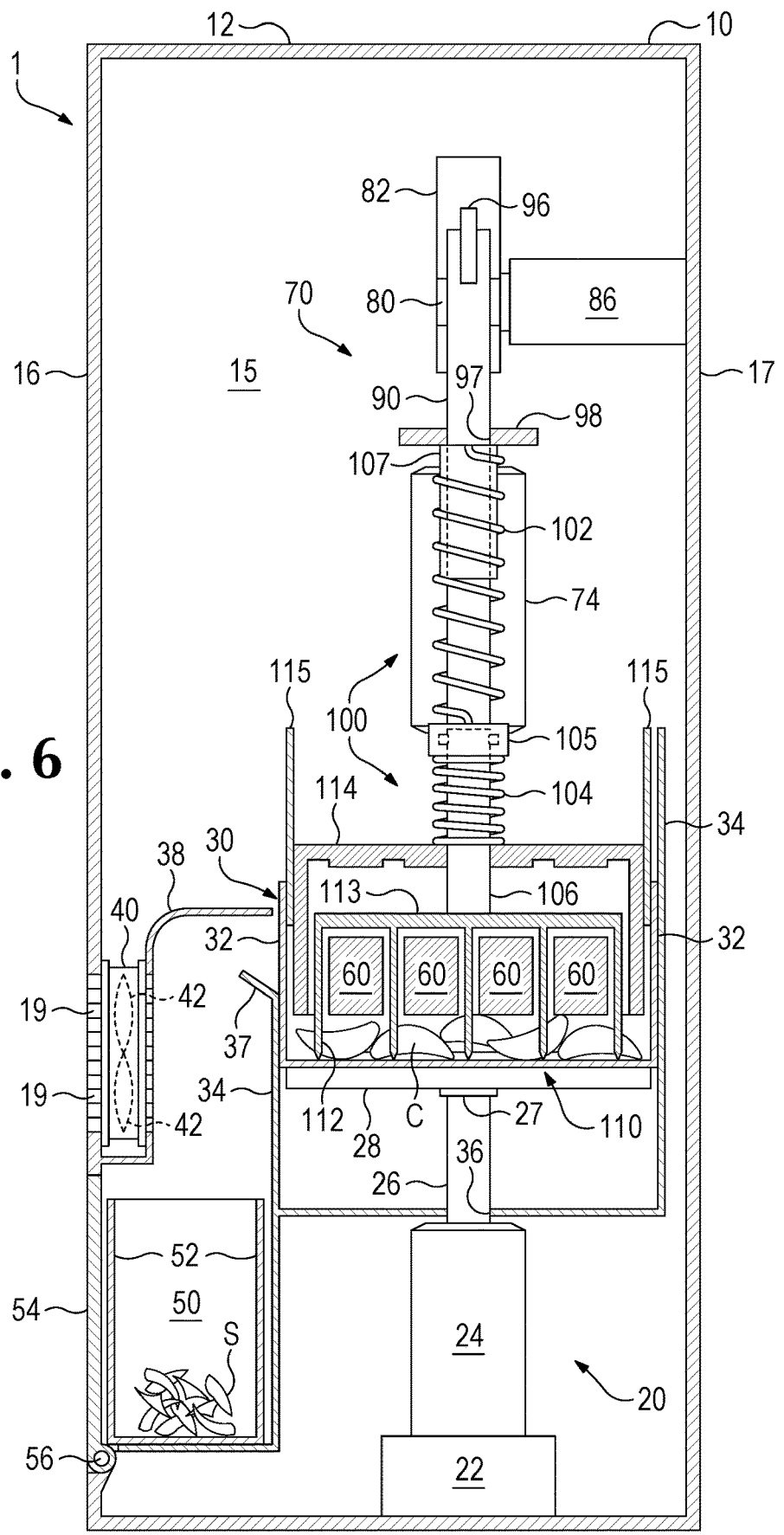
FIG. 6 is a front, side view of an embodiment of the food processor of FIG. 1, including chopping, slicing, or mincing the peeled foodstuffs.

Referring primarily to FIG. 1, FIG. 2, and FIG. 6, the food processor 1 can provide further processing of the whole, peeled cloves C in food bin 30 by way of cut drive mechanism 70, which includes fulcrum 80, column 90, spring-spring combination 100, and cutting support 110. In an embodiment of the food processor 1, while peel drive mechanism 20 is activated or reactivated supra in concert with cut drive mechanism 70, whole, peeled garlic cloves C can next be chopped, sliced, diced, and minced, depending on the cut program setting selected. In addition, the cut drive mechanism 70 includes mount 72, electromechanical actuator 74, spool 76, pin 77 and roller 78. The electromechanical actuator 74 can, but not necessarily, be a commercially available push-type solenoid, pull-type solenoid, or a push/pull-type solenoid. The illustrative and commercially available examples of the electromechanical actuator 74 of the cut drive mechanism 70 are not intended to preclude embodiments which incorporate similar or equivalent electric motors, cam shafts with lifter plates, cranks, crank substitutes, or other solenoids currently or prospectively available.

In another embodiment, the cut drive mechanism 70 can, but not necessarily, include mount 72, and electromechanical actuator 74, as positioned from back 15 of the food processor 1, without the usage of fulcrum 80 and arm 82.

With continuing reference primarily to FIG. 1, FIG. 2, and FIG. 6, upon activation of electromechanical actuator 74, roller 74 is spun counterclockwise about the pin 77 within spool 78, thereby causing the first end of the arm 82 near the electromechanical actuator 74 to be driven upwards. Fulcrum 80 having fin 84 is mounted on the fulcrum mount 86. The fulcrum 80 drives the second end of the arm 82 to spin roller 96 about pin 94 within the spool 92 in a clockwise direction. Piston 106 of column 90 is driven downward into through hole 97 of the ledge 98 having a brace 99. Spring-spring combination 100 includes first spring 102, second spring 104, divider 105, and piston 106.

Now with reference primarily to FIG. 6, piston 106 drives the spine 113 of the cutting support 110 downward causing the blades of the cutting support 110 to make contact with the cloves C. First spring 102 and second spring 104 can take the form of first and second coiled biases having pigtail end coils, in which one end of each of the first and second coiled biases can be coupled to the divider 105, the other end of the first coiled bias coupled to the ledge 98, and the other end of the second coiled bias coupled to the cutting support 110. Thus, first spring 102 and second spring 104 each are separably elastic in compression as well as extension or tension. During the cutting operations, the first spring 102 of the spring-spring combination tensions from its original static position while the second spring 104 of the spring-spring combination 100 compresses. The illustrative example of the spring-spring combination 100 of the cut drive mechanism 70 is not intended to preclude embodiments which incorporate similar or equivalent spring combinations or springs in series, currently or prospectively available.

The cutting support 110 includes side walls and a top 114 and a cutting support guide 115. Cutting support 110 can, but not necessarily, be a housing member or framework that couples to a blade or blades 112. The cutting support 110 and its blades 112 can be selectively movable within a second food processing range of motion defined by a repeated downward then upward motion of the cutting support 110 and blades 112 caused by the operation of the electromechanical actuator 74. The illustrative example of the cutting support 110 is not intended to preclude embodiments which incorporate similar or equivalent blade or cutting configurations and designs, such as frameworks or grids, currently or prospectively available.

Electromechanical actuator 74, operably coupled to the cutting support 110 and blades 112, is disposed in juxtaposition to the food bin 30. When both electromechanical actuators 24, 74 reach the extent of their ranges of motion, the blades 112 extend downward in close approximation to making contact with or nearly contacting the bottom 32 of the food bin 30. Thus, any foodstuffs within the food bin 30 can be chopped, sliced, diced, and/or minced, depending on the length of time of the selectively programmable cutting operation. The foodstuffs; e.g., chopped, sliced, diced, and/or minced garlic cloves C, in whatever desired form, can then be removed from the interior 18 of the food processor 1 by removing the food bin 30 out through the open door 2, after the peel drive mechanism 20 and cut drive mechanism 70 finish the programmed operation cycle and become reset.

In various embodiments, the blades 112 of the cutting support 110 of the food processor 1 are detachable and replaceable with new or different blades for selectively cutting the cloves C. The illustrative example of the blades 112 is not intended to preclude embodiments which incorporate similar or equivalent flat cutting edges and saws disposed in a series next to one another or crisscross from each other, currently or prospectively available.

The present teachings thus advantageously provide for a food processor 1 that peels, chops, slices, dices, and minces. The present teachings provide for numerous other advantages as well, as will be recognized by one skilled in the art.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 routes refers to groups having 1, 2, or 3 routes. Similarly, a group having 1-5 impact zones, for example, refers to groups having 1, 2, 3, 4, or 5 impact zones and more or less, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. An apparatus, comprising:
   a receptacle configured to receive foodstuffs having a skin or peel;
   a first actuator operably coupled to the receptacle defining a first food processing range of motion, the receptacle selectively movable within the first food processing range of motion; and
   a second actuator operably coupled to a cutting member disposed in vertical juxtaposition to the receptacle, the cutting member selectively movable within a second food processing range of motion,
   wherein an extent of movement of the first food processing range of motion ends with the foodstuffs crushed between a floor of the receptacle and a plurality of crusher blocks disposed between blades of the cutting member.

2. The apparatus of claim 1, wherein the extent of movement of the first food processing range of motion repeats with a programmable frequency to cause a plurality of skins or peels to detach from the foodstuffs.

3. The apparatus of claim 1, further comprising a fan coupled to an interior of the apparatus to forcibly draw the plurality of skins or peels of the foodstuffs out of the receptacle.

4. The apparatus of claim 1, wherein the extent of movement of the first food processing range of motion in concert with an extent of movement of the second food processing range of motion ends with the foodstuffs chopped, sliced, diced, minced, or combinations thereof by the blades of the cutting member.

5. The apparatus of claim 4, wherein the extent of movement of the first food processing range of motion in concert with the extent of movement of the second food processing range of motion repeats with the programmable frequency to cause the foodstuffs to be subjected to an edge geometry of the blades.

6. The apparatus of claim 5, wherein the first food processing range of motion operates concurrently with and correspondingly to the second food processing range of motion.

7. The apparatus of claim 1, wherein the first actuator and second actuator each comprise a solenoid.

8. The apparatus of claim 1, further comprising a fulcrum coupled between the second actuator and a piston.

9. The apparatus of claim 8, wherein a first coiled bias and a second coiled bias wind around the piston, separably elastic from one another.

10. The apparatus of claim 9, wherein the first coiled bias compresses when the second coiled bias tensions.

11. The apparatus of claim 9, wherein the first coiled bias tensions when the second coiled bias compresses.

12. The apparatus of claim 3, wherein the foodstuffs comprise garlic cloves.

13. The apparatus of claim 1, further comprising a microcontroller communicatively coupled to a non-transitory computer readable medium containing computer executable instructions executable to activate at least the first and second actuators.

14. An apparatus, comprising:
a receptacle configured to receive foodstuffs having a skin or peel;
a first actuator operably coupled to the receptacle defining a first food processing range of motion, the receptacle selectively movable within the first food processing range of motion;
a second actuator operably coupled to a cutting member disposed in vertical juxtaposition to the receptacle, the cutting member selectively movable within a second food processing range of motion;
wherein an extent of movement of the first food processing range of motion ends with the foodstuffs crushed between a floor of the receptacle and a plurality of crusher blocks disposed between blades of the cutting member,
wherein an extent of movement of the first food processing range of motion in concert with an extent of movement of the second food processing range of motion ends with the foodstuffs chopped, sliced, diced, minced, or combinations thereof by the blades of the cutting member.

15. The apparatus of claim 14, wherein the extent of movement of the first food processing range of motion repeats with a programmable frequency to cause a plurality of skins or peels to detach from the foodstuffs, and wherein the extent of movement of the first food processing range of motion in concert with the extent of movement of the second food processing range of motion repeats with the programmable frequency to cause the foodstuffs to be subjected to an edge geometry of the blades.

16. The apparatus of claim 14, further comprising a fulcrum coupled between the second actuator and a piston.

17. The apparatus of claim 16, wherein a first coiled bias and a second coiled bias wind around the piston, separably elastic from one another.

18. The apparatus of claim 15, wherein the foodstuffs comprise garlic cloves.

19. The apparatus of claim 14, further comprising a microcontroller communicatively coupled to a non-transitory computer readable medium containing computer executable instructions executable to activate at least the first and second actuators.

* * * * *